(12) United States Patent
Kikuchi

(10) Patent No.: US 8,518,322 B2
(45) Date of Patent: Aug. 27, 2013

(54) METHOD FOR MANUFACTURING HONEYCOMB STRUCTURE AND HONEYCOMB STRUCTURE

(75) Inventor: Yoshio Kikuchi, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 651 days.

(21) Appl. No.: 12/707,740

(22) Filed: Feb. 18, 2010

(65) Prior Publication Data
US 2010/0247850 A1    Sep. 30, 2010

(30) Foreign Application Priority Data
Mar. 25, 2009  (JP) .................... 2009-073041

(51) Int. Cl.
*C04B 33/32* (2006.01)
*B28B 3/00* (2006.01)

(52) U.S. Cl.
USPC ............ 264/630; 264/631; 264/638; 264/669

(58) Field of Classification Search
None
See application file for complete search history.

(56) References Cited

U.S. PATENT DOCUMENTS

| | | | | |
|---|---|---|---|---|
| 2,844,486 A | * | 7/1958 | Lamar | 244/16 |
| 5,820,967 A | * | 10/1998 | Gadkaree | 428/116 |
| 5,824,143 A | * | 10/1998 | Chalasani et al. | 106/181.1 |
| 5,938,992 A | * | 8/1999 | Hamanaka et al. | 264/43 |
| 6,004,501 A | | 12/1999 | Cornelius et al. | |
| 6,048,490 A | | 4/2000 | Cornelius et al. | |
| 6,210,626 B1 | | 4/2001 | Cornelius et al. | |
| 6,589,627 B1 | * | 7/2003 | Nakanishi et al. | 428/116 |
| 2003/0189269 A1 | | 10/2003 | Makino et al. | |
| 2004/0071648 A1 | * | 4/2004 | Delacour et al. | 424/70.12 |
| 2004/0241442 A1 | * | 12/2004 | He et al. | 428/397 |
| 2005/0221053 A1 | * | 10/2005 | Tomita et al. | 428/116 |
| 2006/0086837 A1 | * | 4/2006 | He et al. | 241/22 |
| 2007/0148404 A1 | | 6/2007 | Tomita et al. | |

FOREIGN PATENT DOCUMENTS

| | | |
|---|---|---|
| JP | 11-092214 A1 | 4/1999 |
| JP | 11-100259 A1 | 4/1999 |
| JP | 3227039 B2 | 8/2001 |
| JP | 2005-097034 | 4/2005 |
| JP | 3799241 B2 | 4/2006 |
| WO | 2006/046542 A1 | 5/2006 |

OTHER PUBLICATIONS

Malandrini et al., "Interactions between Talc Particles and Water and Organic Solvents", J. Colloidal and Interfacial Science 194, 183-193, published 1997.*

Japanese Office Action, Japanese Application No. 2009-073041, dated Jul. 31, 2012 (2 pages).

* cited by examiner

*Primary Examiner* — Christina Johnson
*Assistant Examiner* — Lisa Herring
(74) *Attorney, Agent, or Firm* — Burr & Brown

(57) ABSTRACT

There is provided a method for manufacturing a honeycomb structure comprising the steps of: forming kneaded clay containing a forming mixture of cordierite-forming materials and an organic binder to manufacture a honeycomb formed article, and firing the honeycomb formed article. The forming mixture contains at least hydrophilic talc. The method enables to perform extrusion forming at a high rate even without raising an apparatus load in order to improve productivity and can provide a honeycomb structure.

4 Claims, 3 Drawing Sheets

METHOD FOR MANUFACTURING HONEYCOMB STRUCTURE AND HONEYCOMB STRUCTURE

BACKGROUND OF THE INVENTION

The present invention relates to a method for manufacturing a honeycomb structure and to a honeycomb structure. More specifically, the present invention relates to a method for manufacturing a honeycomb structure capable of obtaining a well-formed honeycomb structure even when the water content in kneaded clay is small and to a honeycomb structure obtained by the manufacturing method.

A ceramic honeycomb structure is used in order to trap dust and particulate matter contained in exhaust gas from an automobile, incineration exhaust gas generating upon incineration of waste and the like and, further, in order to adsorb and absorb NOx, CO, HC and the like in the aforementioned exhaust gases with a loaded catalyst. Among such honeycomb structures, a cordierite based honeycomb structure is used as one excellent in thermal shock resistance (see JP-A-11-92214 and JP-A-11-100259).

As a method for manufacturing such a cordierite based honeycomb structure, there is disclosed, for example, a method of manufacturing a ceramic structure, where a ceramic raw material (forming mixture), water, an organic binder, and the like are kneaded to obtain kneaded clay having improved plasticity (flowability), and the kneaded clay is subjected to extrusion forming, followed by drying and firing (see Japanese Patent No. 3227039). The reason why the kneaded clay contains an organic binder is because plasticity (flowability), shape retainability, and the like required for the forming cannot be obtained sufficiently only by the ceramic raw material powder and water. The addition of an organic binder and the like improves extrusion formability (balance between flowability and shape retainability). Besides, as a manufacturing method for improving extrusion formability, for example, there is a method where a fatty acid salt having a specific carbon number is blended as a dispersant at a certain proportion. This enables to manufacture a honeycomb structure having excellent extrusion formability with high productivity and is a honeycomb structure-manufacturing method capable of reducing a load to a forming apparatus (Japanese Patent No. 3799241).

Besides, as a manufacturing method for improving extrusion formability, for example, there is disclosed a method for manufacturing a honeycomb structure, where the forming mixture contains two or more kinds of magnesium-containing substances including at least talc (first magnesium-containing substance), and the magnesium-containing substances (second magnesium-containing substance) other than talc among the magnesium-containing substances has an average particle diameter of 4 μm or less (WO2006/046542). This enables to obtain a well-formed honeycomb structure even when the content of the organic substance in kneaded clay is low.

When an organic binder is added in order to improve extrusion formability, the proportion of water to be blended becomes high to require a vast amount of energy upon drying the formed article and a long drying time, which causes a problem of easy deformation. In addition, when an organic forming auxiliary (e.g., fatty acid salt) is further added to the organic binder, the amount of $CO_2$ generating upon firing is increased to cause a problem of generating an environmental load. Further, when magnesium-containing substances other than talc is used at 40 mass % or more with respect to the total amount of the magnesium-containing substances as the magnesium-containing substances, the thermal expansion coefficient rises to cause a problem of deterioration in thermal shock resistance.

SUMMARY OF THE INVENTION

The present invention aims to provide a method for manufacturing a honeycomb structure, the method enabling to perform extrusion forming at a high rate even without raising an apparatus load in order to improve productivity, and a honeycomb structure obtained by the manufacturing method.

In order to solve the aforementioned problems, the present inventor found out that, by the use of hydrophilic talc, it is possible to improve flowability even with a small amount of water in kneaded clay and perform extrusion forming at a high rate. That is, according to the present invention, there is provided the following method for manufacturing a honeycomb structure and the following honeycomb structure.

According to a first aspect of the present invention, the method for manufacturing a honeycomb structure is provided, comprising the steps of: forming kneaded clay containing a forming mixture of cordierite-forming materials and an organic binder to manufacture a honeycomb formed article, and firing the honeycomb formed article; wherein the forming mixture contains at least hydrophilic talc whose immersion heat with respect to water is 0.31 J/m2 or more.

According to a second aspect of the present invention, the method for manufacturing a honeycomb structure according to the first aspect is provided, wherein a content of the hydrophilic talc is 50 mass % or more with respect to a whole talc content of the forming mixture.

According to a third aspect of the present invention, the method for manufacturing a honeycomb structure according to the first or second aspects is provided, wherein the hydrophilic talc has an organic binder adsorption amount of 3.6 mg/m2 or less.

According to a fourth aspect of the present invention, the method for manufacturing a honeycomb structure according to any one of the first to third aspects is provided, wherein the organic binder is a water-soluble cellulose derivative.

According to a fifth aspect of the present invention, the method for manufacturing a honeycomb structure according to any one of the first to fourth aspects is provided, wherein a content of the organic binder is 5 mass % or less with respect to the whole forming mixture.

According to a sixth aspect of the present invention, the method for manufacturing a honeycomb structure according to any one of the first to fifth aspects is provided, wherein the forming mixture contains kaolin, alumina, aluminum hydroxide, and silica.

According to a seventh aspect of the present invention, a honeycomb structure obtained by any one of the methods for manufacturing a honeycomb structure according to any one of the first to sixth aspects above.

A method for manufacturing a honeycomb structure of the present invention can perform extrusion forming at a high rate even without raising an apparatus load and can improve productivity (the number of products per unit time). By using hydrophilic talc instead of using an organic dispersant or a magnesium-containing substance other than talc, flowability can be improved, and the water content can be reduced. Since the water content can be reduced, a drying load can be reduced to inhibit deformation during drying. That is, there can be manufactured a honeycomb structure having flowability upon extrusion and having shape retainability after the extrusion. In addition, since it has less organic components, generation of $CO_2$ can be suppressed.

REFERENCE NUMERALS

Figure 1:
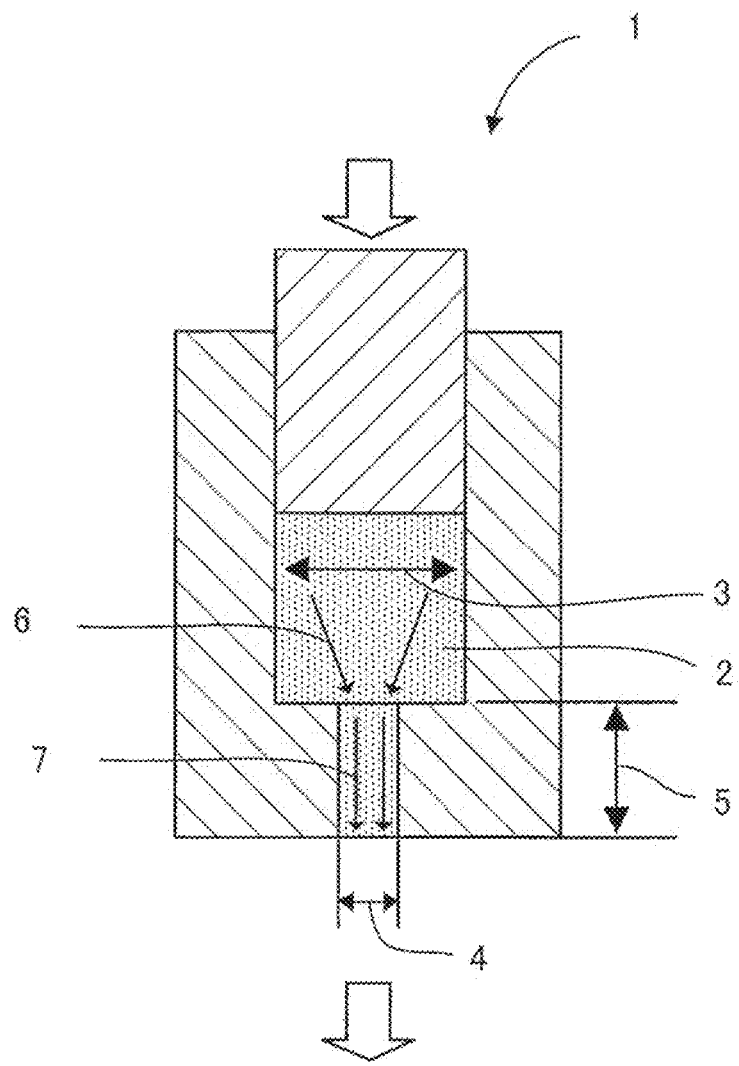
FIG. 1 is a cross sectional view showing a jig for measuring the relation between extrusion pressure and extrusion speed for evaluation of kneaded clay.
Figure 2:
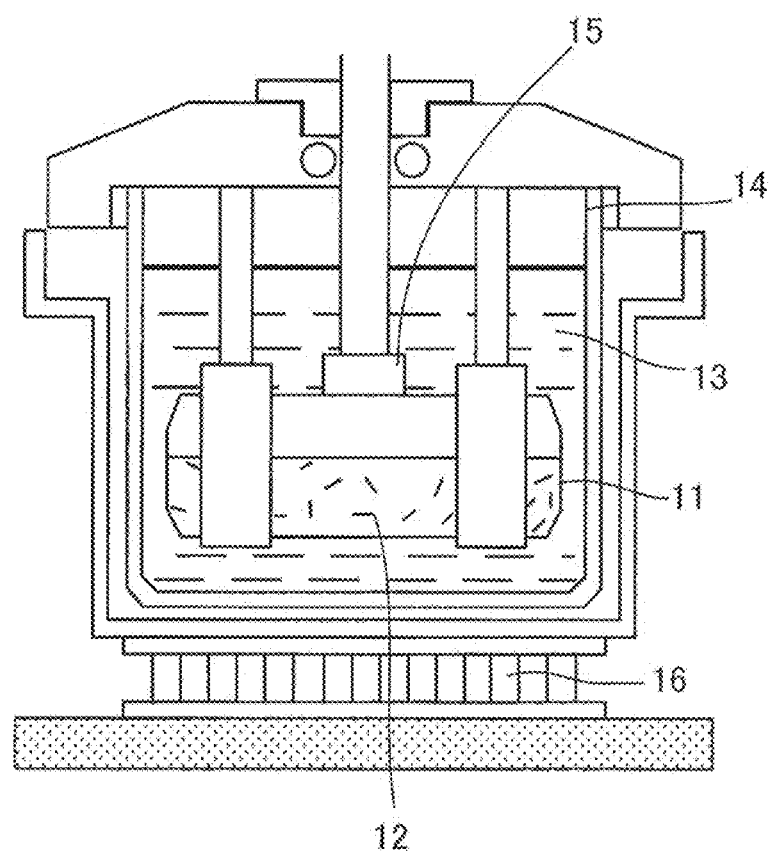
FIG. 2 is an explanatory view for explaining a method for measuring immersion heat.

1; jig, 2; kneaded mixture, 3; cylinder diameter, 4; length of cross section of slit, 5; slit length in extrusion direction, 6; contraction flow, 7; slit passing flow, 11; glass ampule, 12; talk powder, 13; purified water, 14; sample container, 15; hammer, 16; heat sensitizer.

DETAILED DESCRIPTION OF THE INVENTION

Hereinbelow, embodiments of the present invention will be described with referring to drawings. The present invention is by no means limited to the following embodiments, and changes, modifications, and improvements may be made as long as they do not deviate from the scope of the invention.

A method for manufacturing a honeycomb structure of the present invention is a method for manufacturing a honeycomb structure, where a honeycomb structure is obtained by forming kneaded clay containing a forming mixture of cordierite-forming materials and an organic binder to manufacture a honeycomb formed article and firing the honeycomb formed article; where the forming mixture contains at least hydrophilic talc. Since hydrophilic talc is contained, flowability upon forming can be improved. In addition, shape retainability after forming is good.

In the present invention, the forming mixture of the aforementioned cordierite-forming materials is made to have the same composition (cordierite composition) as cordierite by blending predetermined ceramic raw materials so as to form cordierite when it is fired. An example of a suitable cordierite composition is $2MgO.2Al_2O_3.5SiO_2$. The hydrophilic talc serves as a magnesium source of the aforementioned cordierite.

As a magnesium source in the forming mixture, generally, talc ($3MgO.4SiO_2.H_2O$) is suitably used. This is because the resultant cordierite can have a small thermal expansion coefficient. However, talc has a hydrophobic surface and does not get wet. In the case that kneaded clay is manufactured by kneading the forming mixture with water and subjected to extrusion forming, when a large amount of raw material having a hydrophobic characteristic is contained, formability is deteriorated, which may cause a deformation of a resultant honeycomb structure or cause a crack or a fine. Therefore, by using an organic binder in an amount corresponding with the talc blending ratio, improvement in formability is planned. However, since the organic binder cause deterioration in strength of a resultant honeycomb structure, environmental pollution, and the like, the amount of the organic binder is preferably reduced as much as possible.

Therefore, in a manufacturing method of the present invention, hydrophilic talc is used. The hydrophilic talc is talc having an immersion heat of $0.31 J/m^2$ or more with respect to water. The immersion heat is an index representing affinity for water, and a higher immersion heat value shows a higher affinity for water. The hydrophilic talc is talc obtained by a treatment under humid conditions with paying attention to it lest the talc powder should have high temperature by the energy generated by pulverization upon the pulverization of a talc raw stone. That is, to obtain hydrophilic talc, it is important not to be exposed to high temperature. Therefore, talc can be obtained by wet pulverization with paying sufficient attention to temperature and controlling the drying temperature lest it should become excessively high. Though it is desired that the immersion heat of the hydrophilic talc used is high, it is preferably $0.31 J/m^2$ or more, more preferably p. $35 J/m^2$ or more, particularly preferably $0.38 J/m^2$ or more. Since talc having higher immersion heat has higher affinity for water, the water amount can be reduced.

The hydrophilic talc content is preferably 50 mass % or more, more preferably 90 mass % or more, with respect to the whole talc content in the forming mixture. When it is below 50 mass %, the effects of improving flowability and reducing the water amount cannot be obtained sufficiently.

The hydrophilic talc has an organic binder adsorption amount of preferably 3.6 $mg/m^2$ or less, more preferably 3.0 $mg/m^2$ or less. When the organic binder adsorption amount is large, talc particles hardly flow due to the organic binder adhering to a surface of the talc to deteriorate flowability. When it is above 3.6 $mg/m^2$, the effect of improving flowability cannot be obtained sufficiently.

As a substance contained in the forming mixture in a method for manufacturing a honeycomb structure of the present embodiment, there may suitably be selected and used a substance forming a cordierite composition ($2MgO.2Al_2O_3.5SiO_2$) as a whole forming mixture besides the aforementioned hydrophilic talc. For example, it is preferable to contain kaolin ($Al_2O_3.2SiO_2.2H_2O$), alumina ($Al_2O_3$), aluminum hydroxide ($Al(OH)_3$) and silica ($SiO_2$). Other than these substances, there can be used mullite ($3Al_2O_3.2SiO_2$), boehmite (AlOOH), calcined kaolin, and the like.

In a method for manufacturing a honeycomb structure of the present embodiment, the aforementioned raw materials such as hydrophilic talc are mixed to obtain a formed mixture of cordierite forming materials. As the mixing apparatus, there can be used an apparatus generally used for mixing powers.

In a method for manufacturing a honeycomb structure of the present embodiment, though kneaded clay is obtained by adding an organic binder to the forming mixture and kneading them, it is preferable to manufacture kneaded clay by adding an organic substance such as a pore former and a surfactant and water to the mixture and kneading them.

An organic binder improves plasticity and formability of the kneaded clay and functions as a shape retainer for retaining the shape of the honeycomb formed article. On the other hand, since the organic binder has a problem of forming a defect in the space which the organic binder occupies upon forming or forming a defect such as a crack in the honeycomb structure to deteriorate strength in the honeycomb structure, the content in the kneaded clay is preferably minimal. Also, from the viewpoint of environmental problems, the organic binder content is preferably minimal. Therefore, in the present invention, the organic binder content is preferably 8 mass % or less, more preferably 5 mass % or less, particularly preferably 2 mass % or less, with respect to the whole forming mixture. In addition, it may be 0 mass %. In a manufacturing method of the present invention, the organic binder content can be reduced, which means that the $CO_2$ generation amount can be reduced.

As the organic binder, it is preferable to use a water-soluble cellulose derivative. Specifically, there can be used hydroxypropoxylmethyl cellulose, hydroxypropylmethyl cellulose, methyl cellulose, hydroxyethyl cellulose, carboxylmethyl cellulose, and the like. The organic binder can be used alone or as a combination of two or more kinds.

In a method for manufacturing a honeycomb structure of the present embodiment, when a honeycomb structure having high porosity is manufactured, it is preferable that a pore former is contained in the kneaded clay. Such a pore former enables to form pores having a desired shape, size, and distribution; increase the porosity; and obtain a honeycomb structure having high porosity. Examples of the pore former include graphite, flour, starch, phenol resin, methyl polymethacrylate, polyethylene, polyethylene telephthalate, water-absorbing resin, and a resin balloon (acrylonitrile based plastic balloon or the like). These are burnt off instead of forming pores. Of these, a resin balloon is preferable from the viewpoint of suppressing generation of $CO_2$ and harmful gas and crack generation. In addition, as an inorganic pore former, there may be used silica gel, a fly ash balloon, or the like. Incidentally, when a pore former is used, there is no particular limitation on the pore former content. However, it is preferably 15 mass % or less, more preferably 13 mass % or less, with respect to the whole kneaded clay. When it is above 15 mass %, strength of the resultant honeycomb structure may be deteriorated.

In a method for manufacturing a honeycomb structure of the present embodiment, it is preferable that kneaded clay contains a surfactant. The surfactant improves dispersibility of raw material particles and makes orientation of the raw material particles easy upon extrusion forming. Of course, it has a function of improving wettability for water by functioning the hydrophobic surfaces of the talc particles. The surfactant may be anionic, cationic, nonionic, or amphoteric ionic; and may specifically be an anionic surfactant such as a fatty acid salt, alkyl sulfuric ester salt, polyoxyethylene alkyl ether sulfate ester salt, polycarboxylate, and polyaklylate; or a nonionic surfactant such as polyoxyethylenealkyl ether, polyoxyethylene glycerin fatty accide ester, or polyoxyethylene sorbitan (or sorbitol) fatty acid ester. Particularly, potassium laurate is preferable from the viewpoint of orientation of the particles.

In addition, it is preferable that the kneaded clay contains water as the dispersion medium. The ratio of the dispersion medium contained can be adjusted so that the kneaded clay upon forming have appropriate hardness and is preferably 10 to 50 mass % with respect to the whole forming mixture. The method for manufacturing a honeycomb structure of the present embodiment exhibits excellent effects particularly in the case of manufacturing kneaded clay by kneading the forming mixture with water contained therein. By the use of water as the dispersion medium and hydrophilic talc, the forming mixture and the like have a better affinity for water, thereby improving formability.

In a method for manufacturing a honeycomb structure of the present embodiment, a continuous extruder can be employed. In a method for using the continuous extruder, there can continuously be conducted a kneading step of putting the forming mixture, organic binder, and at least water in the continuous extruder and kneading them to obtain kneaded clay and a extrusion-forming step of subjecting the kneaded clay to extrusion forming. Therefore, extremely high productivity can be expected. In the present invention, by the use of hydrophilic talc, flowability can be improved with maintaining shape retainability. When flowability is improved, extrusion can be performed at a high rate, which improves productivity. In addition, since the water amount can be reduced at the same time, drying time can be reduced, which also improves productivity.

On the other hand, the kneading step and the extrusion-forming step can be performed separately. In this case, kneading can performed with a kneader, and extrusion forming can be performed with a ram extruder. When the ram extruder is used, in the present invention, a load upon extrusion can be reduced by the improvement of flowability. That is, energy-saving production can be realized. In addition, since the water amount can be reduced, there is also an effect of reducing a drying load.

In a method for manufacturing a honeycomb structure of the present embodiment, it is preferable that the kneaded clay obtained above is formed into a honeycomb shape and dried to obtain a honeycomb formed article. There is no particular limitation on the shape of the honeycomb formed article, and an example is a shape where a plurality of cells are formed by honeycomb shaped partition walls so as to extend through between two end faces. In the case when the honeycomb structure is used for a filter such as a DPF, it is preferable that end portions of the cells are alternately plugged in the two end faces of the structure. There is no particular limitation on the whole shape of the honeycomb formed article, and examples of the shape include a cylindrical shape, a quadrangular prism shape, and a triangular prism shape. There is no particular limitation on the cell shape (cell shape in a cross section perpendicular to the cell extension direction of the honeycomb formed article), and examples of the shape include a quadrangle, a hexagon, and a triangle.

There is no particular limitation on the drying method, and there can be employed a conventionally known drying method such as hot air drying, microwave drying, dielectric drying, reduced pressure drying, vacuum drying, and freeze drying. Of these, a drying method where hot air drying and microwave drying or dielectric drying are combined is preferable in that the whole formed article can be dried quickly and uniformly.

In a method for manufacturing a honeycomb structure of the present embodiment, there may be performed calcination before firing (main firing) of the honeycomb formed article. The "calcination" means an operation of combusting and removing organic substances (binder, pore former, surfactant, and the like) contained in the honeycomb formed article and is also referred to as degreasing, binder removal, or the like. Since the combustion temperatures of an organic binder, a pore former, and a surfactant are generally about 100 to 300° C., about 200 to 800° C., and about 100 to 400° C., respectively; the calcination temperature may be about 100 to 800° C. There is no particular limitation on the calcination time, and it is generally about 1 to 20 hours. However, in the present invention, since the organic binder amount can be reduced, the calcination time can be reduced. Specifically, it is about 0.5 to 10 hours. This enables to shorten the manufacturing time, which improves production efficiency.

Finally, the calcined article obtained as described above is subjected to firing (main firing) to obtain a honeycomb structure. The "main firing" means an operation of densification by sintering the forming raw materials in the calcined article to secure predetermined strength. As the firing conditions (temperature and time), a ceramic formed article is preferably fired at 1300 to 1500° C., more preferable 1350 to 1450° C. When it is below 1300° C., it may be difficult to obtain the intended cordierite single phase. When it is above 1500° C., it may cause melting. In addition, examples of the firing atmosphere include an ambient atmosphere and an atmosphere where oxygen and nitrogen are mixed at an arbitrary ratio. Further, firing for about 1 to 12 hours is preferable.

A honeycomb structure of the present invention can be obtained by the aforementioned method for manufacturing a honeycomb structure and has high quality (no defect or crack and small thermal expansion coefficient).

EXAMPLE

Hereinbelow, the present invention will be described in more detail on the basis of Examples. However, the present invention is by no means limited to these Examples.

First, hydrophilic talc (Trade name of CT-35 produced by Yamaguchi Mica Co., Ltd.) and non-hydrophilic talc were prepared, and their properties were investigated. The hydrophilic talc was manufactured by wet pulverization, and the non-hydrophilic talc was manufactured by dry pulverization. The hydrophilic talc and the non-hydrophilic talc were measured for the immersion heat for water, organic binder adsorption amount, average particle diameter, BET specific surface area, and apparent density.

The average particle diameter was measured by laser diffraction scattering method (according to JIS R1629), and the apparent density was measured by a fixed capacity expansion method using a dry automatic densimeter (Micrometritics Gas Phycnometer Accupyc).

The measurement of the immersion heat was performed by sealing a talc powder 12 (about 0.5 g) in a vacuum condition in a glass ampule 11, immersing the glass ampule 11 in purified water 13 contained in a sample container 14, breaking the glass ampule 11 with a hammer 15 when a calorimeter reached a condition of thermal equilibrium to disperse the sample (talc powder 12) in the purified water 13, and measuring the amount of heat generated at that time with a heat sensitizer 16. Specifically, there was used Multi Micro Calorimeter (MMC-5111) produced by Tokyo Riko Co., Ltd., with a measurement temperature of 25° C., an Amp range of 250 μV, and a stirring rate of 60 rpm. The solvent was purified water. As the sample pretreatment, vacuuming (8.3×10E-5 mmHg, 4 hours) was performed at a heating temperature of 200° C. Since the unit of the value obtained by this is (J/g), it was divided by the BET specific surface area ($m^2/g$) to obtain a value with a unit of ($J/m^2$). For the BET specific surface area, a flow type specific surface area measurement apparatus (FlowSorb-2300) produced by Micrometritics, Inc., was used. The sample pretreatment was performed at 200° C. for 10 minutes.

The organic binder adsorption amount was measured as follows. In the first place, hydrophilic talc or non-hydrophilic talc of 30 g and an organic binder (hydroxypropylmethyl cellulose) of 1.5 g were mixed together, and water of 8 g was further added, followed by kneading. The kneaded mixture of 1.3 g was taken out and added to water of 60 g. Then, an organic binder concentration in the water was measured by a GPC (gel permeation chromatography). The GPC (gel permeation chromatography) used was HLC-8220GPC produced by Tosoh Corporation. With determining the organic binder amount in the kneaded mixture, the organic binder amount in the water, and the surface area of the talc were as W1, W2, and S, respectively; the adsorption amount was calculated out by the formula: absorption amount=(W1−W2)/S. Incidentally, the surface area S ($m^2$) of the talc was measured by the formula: Bet specific surface area ($m^2/g$)× talc content (g) in the kneaded mixture. In addition, the talc content in the kneaded mixture was measured by the formula: kneaded mixture weight (1.3 g)×talc weight 30 g/(talc 30 g+organic binder 1.5 g+water 8 g). The organic binder adsorption amount and the immersion heat for water are shown in Table 1. Incidentally, the hydrophilic talc 1 of the Tables was CT-35 produced by Yamaguchi Mica Co., Ltd., and the hydrophilic talc 2 of the Tables was the talc obtained by treating the hydrophilic talc 1 at 130° C. for 6 hours with a hot air drier.

TABLE 1

|  | Hydrophilic talc 1 | Hydrophilic talc 2 | Non-hydrophilic talc |
|---|---|---|---|
| Organic binder adsorption amount ($mg/m^2$) | 2.9 | 3.6 | 4.6 |
| Immersion heat for water ($J/m^2$) | 0.389 | 0.313 | 0.278 |
| Average particle diameter (μm) | 10.0 | 9.9 | 10.7 |
| BET specific surface area ($m^2/g$) | 4.3 | 4.2 | 4.6 |
| Density ($g/cm^3$) | 2.83 | 2.83 | 2.81 |

As shown in Table 1, it is shown that each hydrophilic talc had a small organic binder adsorption amount and had a hydrophilic characteristic because of much immersion heat in comparison with non-hydrophilic talc.

Next, a sample where the proportions of hydrophilic talc and non-hydrophilic talc were changed was manufactured, and the flowability and shape retainability of the sample were investigated. In the first place, talc, kaolin, alumina, and aluminum hydroxide were blended so as to give a cordierite composition, and an organic binder (hydroxypropylmethyl cellulose) was added at 5 mass % as a superaddition. Further, water, potassium laurate (0.3 mass % as a superaddition) and glycerin derivative (1 mass % as a superaddition) as organic forming auxiliaries were added to the mixture to obtain a kneaded mixture with an open kneader (produced by Irie Seisakusho Ltd.) and a rotation-revolution stirrer (produced by Thinky Ltd.). The pressure when the kneaded mixture was pressed at a fixed rate by the use of the jig 1 shown in FIG. 1 was measured. FIG. 1 is a cross sectional view showing the jig 1 for measuring the relation between extrusion pressure and extrusion rate for evaluation of kneaded clay. In the jig 1, where the diameter of the cylinder for filling the kneaded mixture 2 thereinto was 25 mm, a cross section of the slit through which the kneaded mixture was extruded had a rectangular shape having a length 4 of 5 mm and a width of 70 μm, and the slit length 5 had three kinds, which were 2, 4, and 6 mm, in the extrusion direction.

By the use of three slits having different slit length, the relation between extrusion rate and pressure was measured. In addition, a graph of extrusion pressure with respect to the slit length was made, and it was approximated by a linear function to calculate out the slope and the intercept. This was analyzed with the Benbow-Bridgwater model of the following formula (1) (Regarding the analysis method, see, e.g., Rheological studies on cordierite honeycomb extrusion, Journal of the European Ceramic Society 22 (2002) 2893-2900).

$$P=(\sigma+\alpha V^m)\ln(Ao/A)+(\tau+\beta V^n)(S/A) \tag{1}$$

P: extrusion pressure, V: slit passing rate (=extrusion rate), Ao: cylinder cross-sectional area, A: slit cross-sectional area, S: slit surface area, σ, α, m, τ, β, n: unknown (=fitting parameter)

The first term or the formula (1) means the resistance of a contraction flow 6 upon the contraction flow from the cylinder to the slit, and the second term means the resistance of the slit passing flow 7 upon passing through the slit. As described above, in extrusion forming, since the resistance is maximum upon passing through the slit, it is necessary to make the second item small for the extrusion at a high rate. Since S and A are form factors, reduction of $\tau+\beta V^n$ corresponds with improvements in flowability. On the other hand, shape retainability just maintains the shape after the forming and relates to a degree of mutual function of the raw material particles at very low deformation speed. In addition, also the resistance upon contraction flow from the cylinder to the slit relates to the degree of mutual function of the raw material particles. Therefore, raising shape retainability is to raise the value at a rate of zero of the first term and corresponds to increasing of a since Ao and A are form factors.

There were calculated $\tau$, $\beta$, n from the slope of the graph of extrusion pressure with respect to the slit length and $\sigma$, $\alpha$, m from the intercept. Evaluation was made with $\sigma$ as the index of shape retainability and $\tau+\beta V^n$ (100 mm/sec was assigned to the slit passing rate V) as the index of flowability. Incidentally, the reason why 100 mm/sec was assigned to V is because 100 mm/sec was employed as the target value since general slit passing rate (extrusion rate) is 10 to 50 mm/sec. The results are shown in Table 2 and FIG. 3.

and 4. Regarding the water ratio, Example 1 had a water ratio reduced by 3% with respect to Comparative Example 1 with $\sigma$ which is equivalent to that of Comparative Example 1. Example 3 had a water ratio reduced by 2% with respect to Comparative Example 1 with a which is equivalent to that of Comparative Example 1. Example 5 had a water ratio reduced by 1% with respect to Comparative Example 1 with $\sigma$ which is equivalent to that of Comparative Example 1. The linear line obtained by Examples 7 and 8, where the hydrophilic talc 2 proportion was 100% and where the water ratio was changed, was in the right lower region with respect to the linear line obtained by Comparative Examples 1 and 2. Regarding the water ratio, Example 7 had a water ratio reduced by 2% with respect to Comparative Example 1 with $\sigma$ which is equivalent to that of Comparative Example 1.

As described above, while maintaining the shape retainability to be equivalent or higher, flowability was improved by the use of hydrophilic talc. In addition, at that time, the water amount was reduced by 2 to 3%.

The present invention can be used for manufacturing a honeycomb structure suitably used for various separation/purification apparatuses effective as a measure for inhibiting

TABLE 2

| | Organic binder addition amount | Non-hydrophilic talc | Hydrophilic talc 1 | Hydrophilic talc 2 | Water ratio | σ(MPa) | $\tau + \beta V^n$(MPa) |
|---|---|---|---|---|---|---|---|
| Example 1 | 5% | 0% | 100% | 0% | 36% | 0.158 | 0.0434 |
| Example 2 | 5% | 0% | 100% | 0% | 38% | 0.133 | 0.0367 |
| Example 3 | 5% | 50% | 50% | 0% | 37% | 0.157 | 0.0439 |
| Example 4 | 5% | 50% | 50% | 0% | 39% | 0.131 | 0.0380 |
| Example 5 | 5% | 60% | 40% | 0% | 38% | 0.156 | 0.0455 |
| Example 6 | 5% | 60% | 40% | 0% | 40% | 0.128 | 0.0408 |
| Example 7 | 5% | 0% | 0% | 100% | 37% | 0.155 | 0.0440 |
| Example 8 | 5% | 0% | 0% | 100% | 39% | 0.129 | 0.0373 |
| Example 9 | 2% | 0% | 100% | 0% | 34% | 0.155 | 0.0498 |
| Example 10 | 2% | 0% | 100% | 0% | 36% | 0.132 | 0.0408 |
| Comp. Ex. 1 | 5% | 100% | 0% | 0% | 39% | 0.154 | 0.0476 |
| Comp. Ex. 2 | 5% | 100% | 0% | 0% | 41% | 0.124 | 0.0450 |
| Comp. Ex. 3 | 2% | 100% | 0% | 0% | 36% | Extrusion impossible | |

Figure 3:
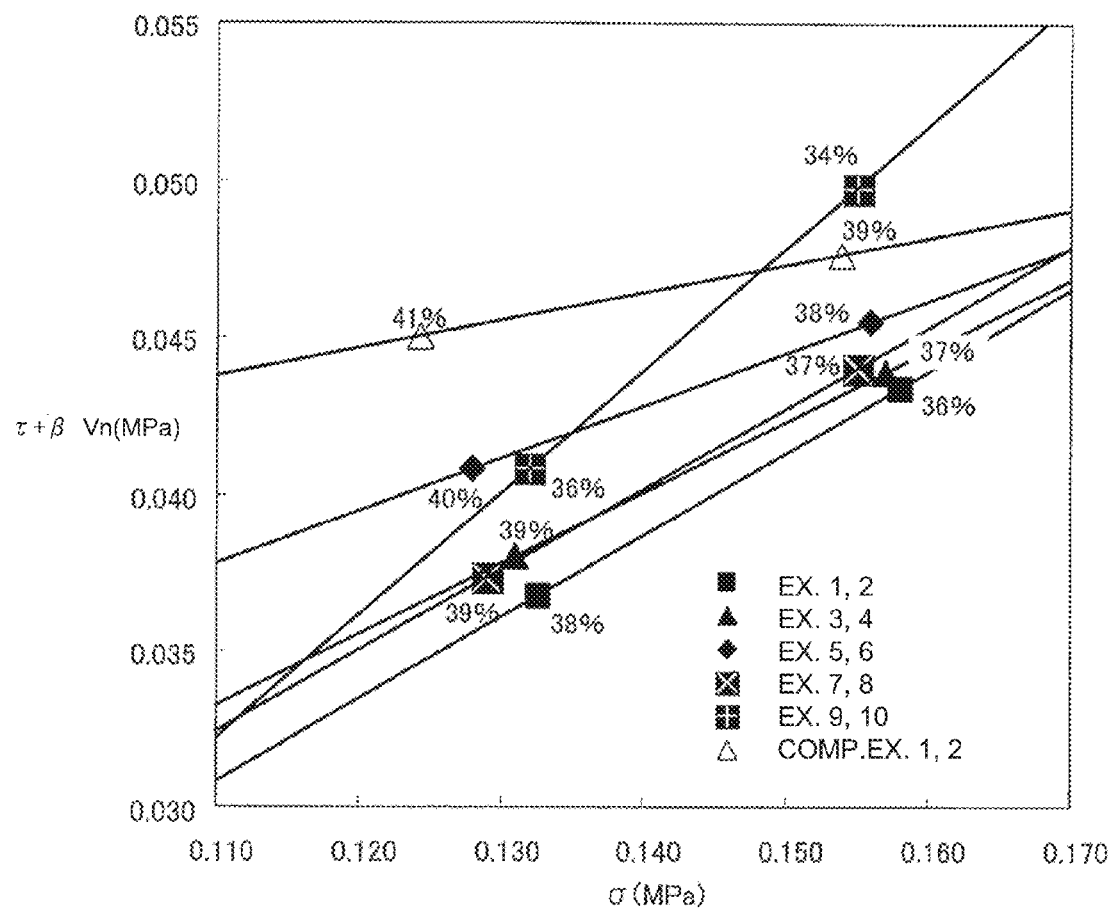
FIG. 3 is a graph showing the relation between shape retainability and flowability.

From the viewpoint of shape retainability, the higher the $\sigma$ (MPa) is, the better. From the viewpoint of flowability, the lower the $\tau+\beta V^n$ (MPa) is, the better. In addition, from the viewpoints of drying deformation and load, the smaller the water ratio is, the better. In addition, the fact that a higher $\sigma$ and a lower $\tau+\beta V^n$ (MPa) are more preferable means that the right lower region in FIG. 3 is preferable. In addition, with the same forming blend and the same organic binder, the linear line becomes ever-increasing by changing the water ratio. That is, it is preferable to be in the right lower region with respect to the linear line obtained by Comparative Examples 1 and 2, where a non-hydrophilic talc was used and where the water ratio was changed.

The linear line obtained by Examples 1 and 2, where the hydrophilic talc 1 proportion was 100% and where water ratio was changed, was in the right lower region with respect to the linear line obtained by Comparative Examples 1 and 2. The linear line obtained by Examples 3 and 4, where the hydrophilic talc 1 proportion was 50%, was in the right lower region with respect to the linear line obtained by Comparative Examples 1 and 2. The linear line obtained by Examples 5 and 6, where the hydrophilic talc 1 proportion was 40%, was in the right lower region with respect to the linear line obtained by Comparative Examples 1 and 2 though it was in the left upper region with respect to the linear line obtained by Examples 1 and 2 or the linear line obtained by Examples 3 environmental pollution and global warming in various fields of chemistry, electric power, iron and steel, industrial waste disposal, and the like.

What is claimed is:

1. A method for manufacturing a honeycomb structure comprising the steps of:
   forming kneaded clay containing a forming mixture of cordierite-forming materials and an organic binder to manufacture a honeycomb formed article, and
   firing the honeycomb formed article;
   wherein the forming mixture contains at least hydrophilic talc whose immersion heat with respect to water is 0.31 J/m² or more:
   wherein a content of the hydrophilic talc is 50 mass % or more with respect to a total talc content of the forming mixture, and
   wherein the hydrophilic talc has an organic binder adsorption of 3.6 mg/m² or less.

2. A method for manufacturing a honeycomb structure according to claim 1, wherein the organic binder is a water-soluble cellulose derivative.

3. A method for manufacturing a honeycomb structure according to claim 1, wherein a content of the organic binder is 5 mass % or less with respect to the whole forming mixture.

4. A method for manufacturing a honeycomb structure according to claim 1, wherein the forming mixture contains kaolin, alumina, aluminum hydroxide, and silica.

* * * * *